June 7, 1955  L. E. VAN BLARICOM ET AL  2,710,255
LIGNOSULFONATE RECOVERY FROM WASTE SULFITE LIQUOR
Filed June 7, 1952  3 Sheets-Sheet 1
LIGNOSULFONATE RECOVERY BY ION EXCHANGE
FIG. I
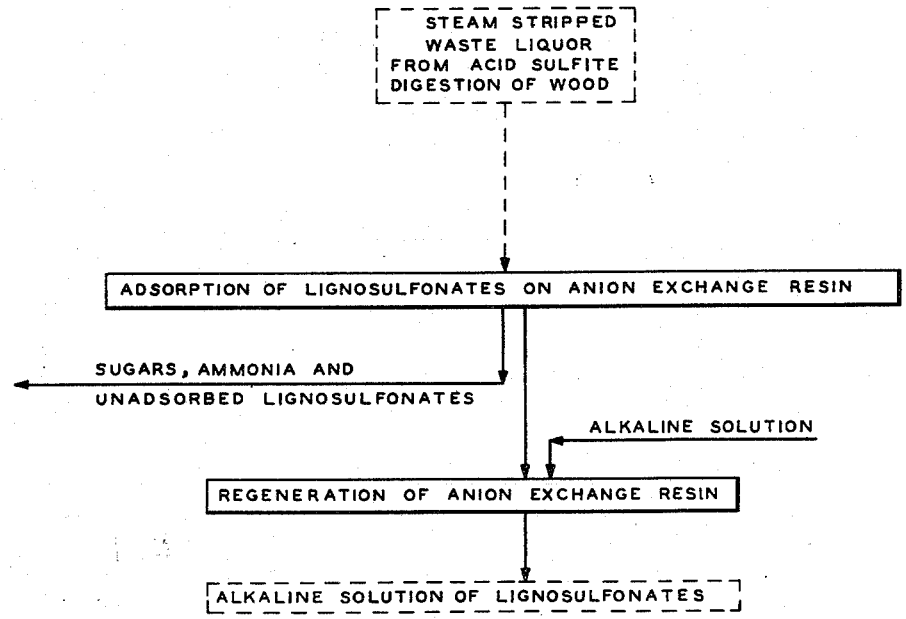
INVENTORS
Lloyd Eugene Van Blaricom
Kenneth Russell Gray
BY
ATTORNEYS

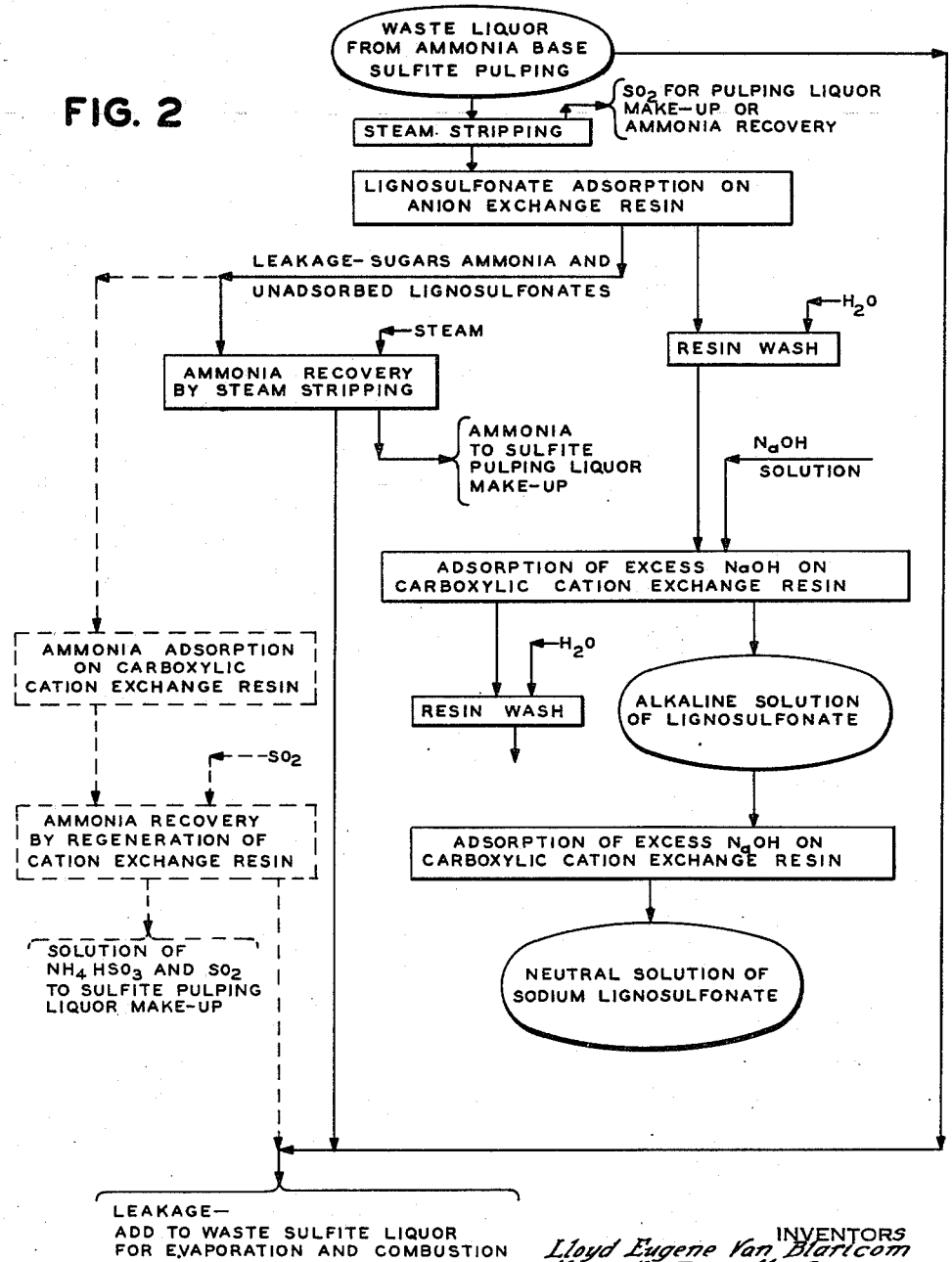

June 7, 1955    L. E. VAN BLARICOM ET AL    2,710,255
LIGNOSULFONATE RECOVERY FROM WASTE SULFITE LIQUOR
Filed June 7, 1952    3 Sheets-Sheet 3
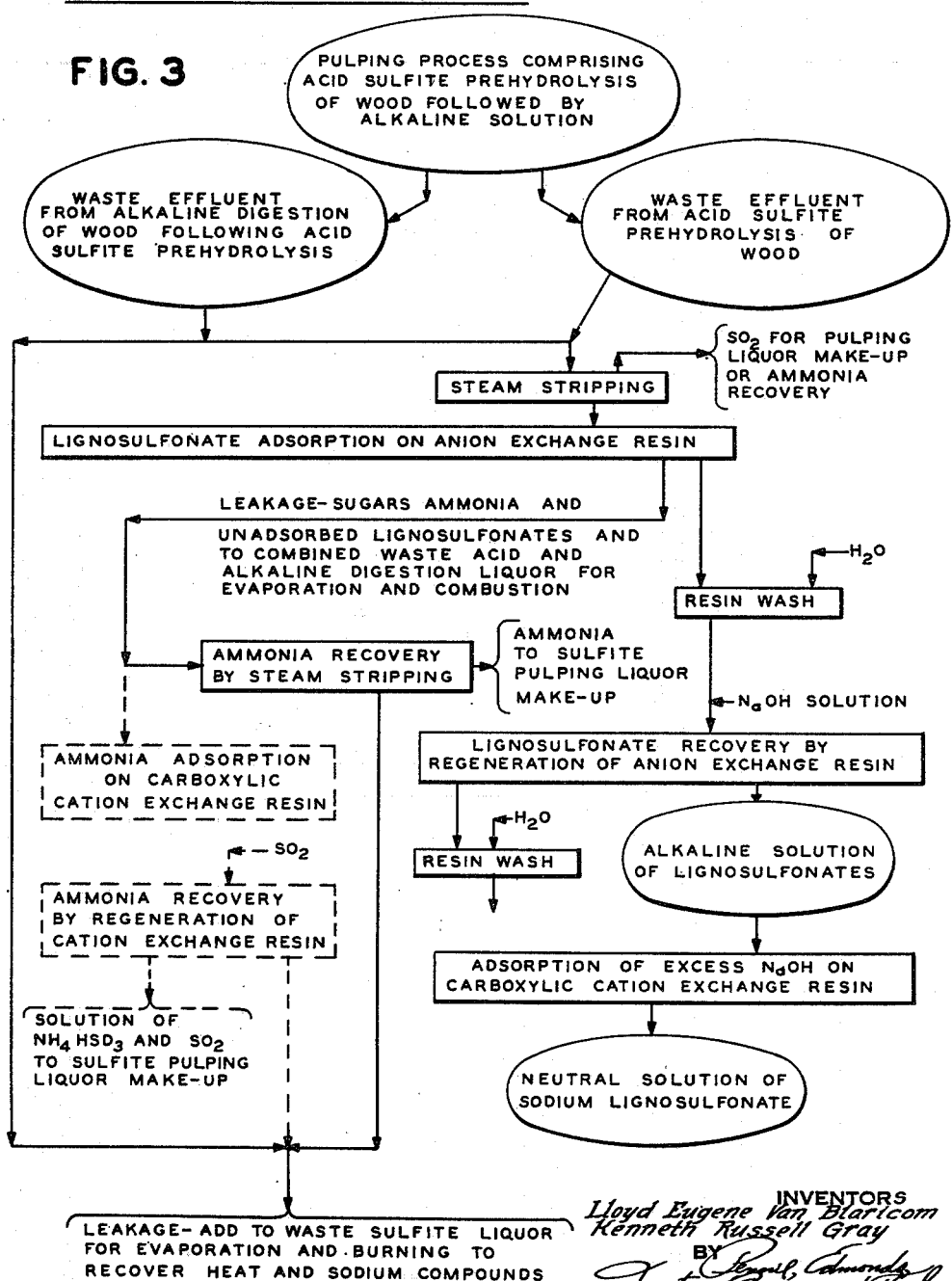
INVENTORS
Lloyd Eugene Van Blaricom
Kenneth Russell Gray
BY
ATTORNEYS

United States Patent Office 2,710,255
Patented June 7, 1955

2,710,255

LIGNOSULFONATE RECOVERY FROM WASTE SULFITE LIQUOR

Lloyd Eugene Van Blaricom and Kenneth Russell Gray, Shelton, Wash., assignors to Rayonier Incorporated, Shelton, Wash., a corporation of Delaware Application June 7, 1952, Serial No. 292,306

16 Claims. (Cl. 92—2)

This invention relates to the separation of useful materials from sulfite waste liquor and provides for the preparation of useful products from such liquor by an ion exchange process.

This application is a continuation-in-part of application Serial No. 223,182, filed April 27, 1951.

It is an object of the invention to separate a lignosulfonate fraction of ammonia base sulfite waste liquor from the sugars, and other undesirable constituents by a process which is practical and economical. In one of its aspects, the invention aims to carry out the process in such a way that it can be integrated with recovery of ammonia or both ammonia and heat in ammonia base acid sulfite pulping.

Another object of the invention is to provide a process for recovery of lignosulfonate from the waste liquor from ammonia base acid sulfite prehydrolysis of wood prior to alkaline pulping.

A further object is to provide soluble lignosulfonate salts substantially free from sugars, heavy metals and other undesirable constituents of the waste liquor. Such purified materials are advantageous both for uses based on the colloidal properties of lignosulfonates and for uses as base materials in the preparation of simpler aromatic organic chemicals from lignosulfonates.

The process of the invention provides for discharge of organic effluents into heat recovery systems for either ammonia base acid sulfite pulping or for two-stage pulping employing ammonia base acid sulfite prehydrolysis. With these integrated processes of pulping and heat recovery, or heat and pulping chemical recovery, an additional object is to provide through further integration with lignosulfonate recovery a high degree of economy in the isolation of lignosulfonates and to eliminate pollution problems connected with the recovery of lignosulfonates.

Broadly the invention provides for the adsorption of lignosulfonates from waste ammonia base acid sulfite digestion liquor by an anion exchange resin in which substantially the only basic radicals or nitrogen-containing groups consisting essentially of tertiary amino groups, and in which quaternary ammonium groups if present are in minor amounts, without first removing the ammonium cations used as a pulping base, followed by regeneration to yield an alkaline lignosulfonate solution free from sugars and other impurities.

In the acid sulfite pulping process, a lignocellulose material is generally cooked in a solution of sulfurous acid, part of the sulfurous acid being combined as bisulfite. The cation combined thus with the bisulfite ion is generally known as the "pulping base" and is used in this sense herein. Pulping-base cations normally used include calcium, sodium, ammonium and magnesium. In common terminology acid sulfite pulping using the ammonium cation as the pulping base is referred to as "ammonia base sulfite (or acid sulfite) pulping" or "ammonium base sulfite pulping."

In one of its embodiments, the invention provides for the steam stripping of ammonia base sulfite waste liquor to remove free sulfur dioxide, treating this stripped liquor with an anion exchange resin of the type hereinafter more fully described, removing the lignosulfonate adsorbed on the resin by regenerating the resin with an alkaline solution, and removing the excess alkali from this regeneration effluent solution by treating it with a cation exchange resin in hydrogen form. Preferably, the cation exchange resin used is a carboxylic acid type resin. There results a solution of sodium lignosulfonate relatively free from sugars and other contaminating materials.

In a more complete form, the invention provides for integration of the lignosulfonate recovery process with integrated systems for recovering heat or heat and pulping chemicals in ammonia base acid sulfite pulping, or in two-stage pulping wherein ammonia base acid sulfite digestion is followed by alkaline pulping. Such integration provides the utmost in economy of operation and eliminates pollution problems. Recovery systems for such two-stage pulping with which the process of the invention may be very readily integrated are those described in copending applications by Kenneth Russell Gray, Hartzell Lance Crosby, and John Charles Steinberg, 415,817 and 415,754, filed March 12, 1954, and United States Letters Patent No. 2,675,297, and United States Letters Patent of Kenneth Russell Gray and Hartzell Lance Crosby Nos. 2,656,249, 2,656,244, and 2,656,245.

In addition to advantageous integration of the lignosulfonate recovery process with a process of ammonia base pulping and evaporation and combustion of the effluent for the recovery of heat (or heat and sulfur dioxide), the process of the invention may be advantageously integrated with a process wherein wood is pulped by the ammonia base acid sulfite process and the waste liquor is evaporated and incinerated for disposal as outlined in U. S. Patent 2,564,028 of Arthur N. Parrett, issued August 14, 1951.

Under the most preferable operating conditions the anion exchange resin used in the process will be substantially free from primary and secondary amino groups and will contain as nitrogen-containing groups either substantially only tertiary amino groups or mixtures containing tertiary amino groups predominantly with a small proportion of quaternary ammonium groups.

As used herein, the term "lignosulfonate" refers to the lignosulfonate anion whether it be present in salts such as the sodium, ammonium, potassium or other salts or whether present as free lignosulfonic acid.

Previous methods for the isolation of lignosulfonate from sulfite waste liquor have involved tedious dialysis procedures or cumbersome precipitation processes requiring extensive settling and filtration operations. There is a need for a simple process for recovering potentially valuable lignosulfonates. Our invention provides such a process in that, with the exception of contacting of the ion exchange resins, it may be carried out as a solution phase process requiring only simple liquid handling equipment and being well adapted to automatic controls.

The general practice in the use of weakly basic anion exchange resins of the amine type (i. e., containing primary and secondary or tertiary amino groups or mixtures of these) has been largely limited to the adsorption of relatively simple anions from solution (e. g., in water conditioning). In all cases, however, in the use of such ion exchange resins of the amine type, it has been considered necessary to remove the metallic cations so that the free acids are actually adsorbed on the resin.

We have made the wholly unexpected discovery that the large lignosulfonate anion may be recovered from sulfite waste liquor by a porous anion exchange resin containing tertiary amino groups without the necessity of first removing pulping-base cations from the liquor. From an economic standpoint this is a most important discovery since the removal of all pulping-base cations from waste liquor would involve treatment with a strongly acidic cation exchange resin in hydrogen form. This would not only involve expense from the standpoint of acid required for regeneration of such a strongly acidic resin but would involve considerable expense connected with handling a corrosive regenerant (e. g., $H_2SO_4$), a corrosive regeneration effluent and a strongly acidic solution resulting from removal of the pulping-base cations from the sulfite waste liquor (possibly having a pH of about 1 to 2).

In the process of our invention, stripped sulfite waste liquor which is only moderately acid (e. g., pH of about 4) is treated with an anion exchange resin substantially free from primary and secondary amino groups and preferably having as exchange groups solely or predominantly tertiary amino groups, whereby lignosulfonate is adsorbed, the pH of the effluent rising as high as 9 to 11. The ability of relatively weakly basic anion exchange resins to function on the alkaline side is again a wholly unexpected result.

While we do not limit the invention to the mechanism described, we believe that the weakly basic tertiary amino groups in the resin function in this novel manner by reason of the polyfunctionality and high molecular weight of the lignosulfonate which is adsorbed, the polyfunctionality being due to the plurality of sulfonic acid groups present.

In any event as a result of our discovery, it is possible to eliminate any preliminary cation exchange step to replace the pulping-base cations in the sulfite waste liquor with hydrogen ions, resulting in a very simple process. The sugars and other undesirable nonionic organic constituents are not adsorbed in our process and can hence be separated in a single step from the adsorbed lignosulfonate.

An additional advantage of the invention is that the useful life of the resin is much longer with ammonia base liquor than with calcium base liquor. This is because on repeated cycling operation with ammonia base liquor there is much less tendency for the anion exchange resin to plug up than where large amounts of calcium are present, as in calcium base liquor.

A further important economic advantage is that when using ammonium base waste liquor an effluent is obtained from the resin treatment which contains free ammonium hydroxide. This free ammonium hydroxide may be readily recovered for reuse in pulping in one of the following two ways: (1) The alkaline effluent may be steam stripped. (2) The effluent may be passed through a carboxylic exchanger in hydrogen form and the resin then treated with sulfurous acid solution to form an ammonium bisulfite-sulfurous acid solution for use in making up ammonia base acid sulfite pulping liquor. The carboxylic type of resin, which is readily regenerated with $SO_2$, will efficiently pick up ammonia in the form of the free base, but will not pick up appreciable amounts of ammonia present in the form of salts of strong acids.

Under the preferred operating conditions of our invention we find it advantageous to treat the resin with an excess of sulfite waste liquor and to thus adsorb on the resin only a part of the lignosulfonate component. While it is possible to carry out the resin treatment so as to adsorb the entire lignosulfonate component of the waste liquor this requires using a large ratio of resin to liquor. In order to attain the maximum capacity of the resin, it is more practical to use an excess of sulfite waste liquor, since sulfite waste liquor is either of no value, or, if it is used for a heat and chemicals recovery system, the effluent from the anion exchange treatment may be added to this system for recovery of heat and inorganic chemical values.

The use of a high ratio of sulfite waste liquor to anion exchange resin is also advantageous in that a fractionation of the lignosulfonate itself is effected. The fraction recovered by adsorption on the resin will in general be the fraction most effective for uses based on adsorption properties, e. g., for uses in tanning, dispersing, etc.

The adsorbed lignosulfonate is eluted from the anion exchange resin by the use of an alkaline solution and if the elution is carried out according to the preferred aspect of our invention, the lignosulfonate can be recovered in this step with only a small excess of alkali present. Sodium hydroxide is the preferred eluting agent, though sodium carbonate, potassium hydroxide or carbonate or ammonium hydroxide may be used.

In the accompanying drawings:

Fig. 1 is a flow sheet illustrating broad aspects of the invention;

Fig. 2 is a flow sheet illustrating a more complete operation of the invention; and Fig. 3 is a flow sheet illustrating another embodiment of the invention.

The general or broad aspects of the invention will be better understood by reference to the accompanying diagram, Figure 1. Ammonia base sulfite waste liquor which has been steam stripped to remove sulfur dioxide is treated with an anion exchange resin free from primary and secondary amino groups and having as exchange centers tertiary amino groups. The effluent or "leakage" from this treatment contains essentially all the sugars originally contained in the liquor, most of the pulping-base cations (ammonium) of the original liquor, and the unadsorbed lignosulfonates. The anion exchange resin containing adsorbed lignosulfonate is treated with an alkaline regenerant such as sodium hydroxide, thereby removing the adsorbed lignosulfonate and resulting in a solution of lignosulfonates substantially free from nonionic organic components of the waste liquor.

We have also found that the excess alkali can be removed from the solution described above by treating the solution with a cation exchange resin in hydrogen form. While any chemically stable cation exchange resin may be used, we have discovered that if a cation exchange resin of the carboxylic type (rather than the sulfonic type) is used, the excess alkali can be removed, and the resin can be easily regenerated into the hydrogen form with sulfur dioxide solutions.

When sodium hydroxide or sodium carbonate is used as the regenerant for the anion exchange resin, the effluent from the regeneration of the cation exchange resin is a sodium bisulfite solution which may contain some free sulfur dioxide. With countercurrent operation in the regeneration of the anion exchange resin the amount of excess sodium which needs be removed in this way is small and accordingly the amount of sodium bisulfite sulfurous acid solution formed as a product is also small. Accordingly it may if desired be mixed with the ammonia base cooking liquid. This is advantageous economically as well as from the standpoint of eliminating any disposal problem for the effluent.

It is also an important feature of the discovery that use of a carboxylic acid type resin, rather than a sulfonic acid type resin to remove excess alkali, results in almost complete removal of metallic impurities such as calcium not completely removed in the anion exchange step. This selective removal of calcium is accomplished without the necessity of an expensive step to remove all cations other than hydrogen from the solution. (Removal of metallic impurities by removing all cations other than hydrogen, rather than by selective removal, would be very undesirable since it would produce a very acid lignosulfonic acid solution of pH less than 2, which would be corrosive and would tend to quickly pick up heavy metals from pipes and metallic containers.)

Our use of carboxylic acid resins provides a simple method for further purification by selectively removing impurities. This is important for such uses as the preparation of tanning agents and dispersing agents for certain uses.

Treatment of the anion exchange resin with the stripped sulfite waste liquor and regenerant solutions may be mechanically accomplished in a number of ways, as, for example, by passing the solutions through a column or bed of the resin. The type of operation wherein the solutions are passed through a fixed bed of resin is hereinafter termed "column operation."

Again the anion exchange resin may be treated with the solution involved in slurry form, generally with stirring. Such slurry treatment may be effected either batchwise or by a continuous addition of the resin to a stream of liquor, later separating the resin from the solution by mechanical means. Such operation involving a slurry, either in batch or continuous treatment, is hereinafter termed "slurry operation."

Generally, in order that the resin will exhibit the highest effective working capacity and in order that regeneration will be most efficient, it will be preferred to treat the anion exchange resin with the solutions in a countercurrent manner. This is especially the case as regards the regeneration step. Such countercurrent operation may be achieved most simply and conveniently by use of a column rather than by use of a multiplicity of slurry stages.

The lignosulfonate product solution from the anion exchange resin may be treated with a cation exchange resin in hydrogen form (to remove alkalinity and selectively remove calcium) in a number of mechanical ways. For example, the solution may be passed through a bed of the resin, or the resin added to the solution either batchwise or in a continuous manner, later separating the resin from the solution by mechanical means. Generally, as with the preceding anion exchange treatment, it will be most convenient to carry out the step as a column operation.

Washing steps following either the anion or cation exchange adsorption or regeneration steps may be carried out in a manner familiar to the art whereby a strong and a weak fraction is recovered, the strong fraction being added to the effluent from the step preceding the wash and the weak fraction being stored for the first wash liquor in the subsequent cycle.

In that the ion exchange process may be carried out in effect as an all solution phase process, it is well adapted to automatic control. The adsorption and regeneration steps and washing operations between these steps may all readily be carried out automatically using conventional control devices such as timing, metering, level control and pH control devices.

The concentration of waste sulfite digestion liquor processed in the invention is not critical. It will, however, frequently be convenient to use sulfite waste liquor of digester strength (e. g. about 8–16% total solids). This liquor being of low viscosity is readily handled with satisfactory flow and a minimum of pressure loss in the columns while still providing sufficient solids content for economical operation.

The temperature of operation is not critical and it is satisfactory to use normal temperatures. However, with the anion exchange resin the use of elevated temperatures (e. g., 50–100° C.) particularly in the adsorption of lignosulfonate is advantageous resulting in a higher working capacity for the resin. Also, treatment of sulfite waste liquor at such elevated temperatures is particularly advantageous when using digester strength liquor since such liquor is normally recovered at approximately 60–90° C.

The use of elevated temperature is also advantageous in the regeneration of the anion exchange resin in that it increases the efficiency of elution of lignosulfonate by alkaline solutions. The effect is, however, much more pronounced when using as regenerant, sodium carbonate rather than sodium hydroxide. With sodium hydroxide as regenerant, it will generally be most practical to supply no heat other than that which may remain in the system if hot sulfite waste liquor is used as the feed liquor in the lignosulfonate adsorption step.

In the regeneration of the resin, the volume of alkaline solution used and the concentration of alkali in it will depend somewhat on the mechanical conditions used in regeneration—e. g., whether regeneration is carried out as a countercurrent or a slurry operation. The total amount of alkali used in the regeneration, however, should be at least equivalent to the amount of lignosulfonic acid adsorbed on the resin. With caustic soda solution as regenerant, we find it very practical to carry out regeneration in a countercurrent manner and to use an appreciable excess of caustic soda in order to rapidly effect as complete a regeneration as possible and then to take off a fraction of the regenerant effluent which will be practically free from excesses of caustic soda, and to recycle the balance of the regeneration effluent which contains considerable excess caustic soda. Such regeneration effluent containing excess caustic soda is satisfactory for use in making up fresh caustic soda regeneration solution in that the presence of a substantial amount of lignosulfonate does not effect the regeneration materially. The absolute concentration of caustic soda in the regeneration solution used is not critical, and we frequently find it convenient to use concentrations of the order of 2 to 10% sodium hydroxide.

In order to attain the maximum ultimate capacity of the resin in the adsorption and complete regeneration, it would be necessary to use much longer times of contact in both adsorption and regeneration steps than would be necessary when treating solutions of simple inorganic ion. While such times for the ultimate in the adsorption and desorption of lignosulfonate may be of the order of one or more hours, for practical operation it will generally suffice to use lower times. We frequently use contact times in adsorption and regeneration of the order to 5–30 minutes.

The ion exchange process of the invention itself will in its various modifications generally produce a relatively dilute solution of sugar-free lignosulfonate (e. g. most generally containing less than 15% lignosulfonic acid). This solution may be used as such for many purposes. Where, however, the product is to be shipped any distance for further use, it will be advantageous to concentrate it by evaporation. This may be done in a manner similar to those methods normally used for concentrating sulfite waste liquor itself. Thus by multi or single stage evaporation a viscous concentrated solution of sugar-free sodium lignosulfonate (e. g. about 40–60% sodium lignosulfonate) may be produced. Alternatively the product solutions from the ion exchange process may be concentrated to a suitable degree by evaporation and then dried to produce a powdered product by conventional drying means such as spray drying, drum drying, vacuum drying, etc. From the standpoint of improved color, it is advantageous to evaporate down a solution of pH about 5 rather than a neutral or slightly alkaline solution.

Ion exchange resins are in general porous, crosslinked polymeric materials which contain ionizable groups throughout the resin which are capable of exchanging one ion for another. They may thus be considered to be solid gel structures of an ionic nature.

Anion exchange resins are ion exchange resins which will usually contain as the exchange groups primary, secondary or tertiary amino groups or quaternary ammonium groups or mixtures of at least two of these types of nitrogen-containing groups. Anion exchange resins in which the exchange groups are essentially primary or secondary amino groups or mixtures of primary, secondary and tertiary amino groups are generally termed "amino type anion exchange resins" or "anion exchange resins of the amine type" to distinguish them from anion exchange resins in which the exchange groups are exclusively or predominantly quaternary ammonium groups. In general anion exchange resins of the amine type may be prepared by condensing either aliphatic or aromatic amines (preferably polyamines) to give a porous, cross-linked polymer, as for example, by use of suitable amounts of formaldehyde or polyhalogen derivatives such as glycerol dichlorhydrin.

Alternatively anion exchange resins of the amine type may be prepared by reacting simultaneously phenol, formaldehyde and a polyethylene polyamine.

Alternatively, amino groups may be introduced into naturally occurring polymeric materials not containing appreciable amounts of such groups by treatment with ammonia in the presence of a catalyst. In such cases where necessary to obtain insolubility, prior, concurrent or subsequent cross-linking will be effected.

From the standpoint of chemical structure, the anion exchange resins which are effective in the process of the invention are cross-linked, nitrogen-containing resins in which substantially all the nitrogen-containing groups are tertiary amino groups and if quaternary ammonium groups be present they are in minor and non-essential amounts. Most effective of all are resins in which essentially the only nitrogen-containing groups are tertiary amino groups.

Anion exchange resins containing appreciable amounts of primary or secondary amino groups are not suitable for use in the invention in that these groups will condense with reducing groups or other reactive groups in substances in the sulfite waste liquor with resulting loss of effective capacity.

As regards resins free from primary and secondary amino groups, an anion exchange resin containing all tertiary amino groups is superior to one containing all quaternary ammonium groups since the latter, in view of its very strong basicity, is much less efficient in regeneration by caustic soda.

In addition to the difficulty in regenerating the strongly basic resins containing quaternary ammonium groups, a further disadvantage of these resins, particularly as regards use in the presence of calcium, which even in the formation of an ammonia base liquor is present in small amount, is the formation of a precipitate during the adsorption stage of the process. This precipitation is probably due in part to the solution becoming more basic than is the case when less strongly basic anion exchange resins are used, and results in obstructing flow of solutions when column operation is used. Resins having as nitrogen-containing groups largely tertiary amino groups with the remainder being a small proportion of quaternary ammonium groups may, however, be regenerated relatively efficiently and are economically practical to prepare.

It might be theoretically possible to prepare directly an anion exchange resin containing only tertiary amino groups. In practice, however, it will generally be more feasible to prepare firstly an anion exchange resin in which at least a substantial portion of the nitrogen-containing groups will be primary or secondary amino groups or mixtures of these. Such primary and secondary amino groups may be readily rendered unreactive to reducing groups by alkylating the resin by treatment with alkyl esters of strong acids (e. g., methyl chloride or dimethyl sulfate) in a manner similar to known procedures by which simple amines are alkylated. The resulting resin will be largely free from primary and secondary amino groups and the effective exchange groups will be a mixture of tertiary amino groups and quaternary ammonium groups, the latter generally in smaller amounts.

A highly porous commercial anion exchange resin of this type largely free from primary and secondary amino groups (sold under the trade-name of Duolite A-4) has been used in the practice of the invention, As a step in the manufacture, this resin was alkylated to remove primary and secondary amino groups. As a result of the commercial alkylation treatment used, the anion exchange centers in the Duolite A-4 resin used are a mixture of tertiary amino groups and quaternary ammonium groups with the tertiary amino groups probably present in larger amounts.

A still more preferred type of anion exchange resin for use in our invention may be prepared as described herein and also described in our copending application Serial No. 348,802, filed April 14, 1953, by treating a highly porous anion exchange resin containing primary or secondary amino groups, or both, with a mixture of formic acid and formaldehyde. By this reaction, primary and secondary amino groups are methylated to form tertiary amino groups with essentially no formation of quaternary ammonium groups. Conveniently the resin in particle form may be heated with an excess of formic acid and formaldehyde in aqueous solution, termination of evolution of $CO_2$ serving as an indication of completion of reaction. In carrying out this reaction a resin should be used whose cross-linkages are stable to this treatment, e. g., one in which the cross-linking is not through methylene diamine bridges.

The resin so treated will have essentially no nitrogen-containing groups other than tertiary amino groups. Such a resin is very stable in the presence of reducing groups and being weakly basic may be regenerated more efficiently than resins alkylated in such a manner as to contain in addition to tertiary amino groups an appreciable proportion of quaternary ammonium groups.

A batch of suitable resin with primary and secondary amino groups eliminated in this manner was prepared from a highly porous commercial resin containing primary and secondary amino groups as follows:

100 g. of Duolite A-2 resin was converted to the free base by treatment with sodium hydroxide and washed thoroughly and then drained. It was then mixed with 222 g. of 90% formic acid and 150 g. of commercial formalin solution, warmed slowly to approximately 90° C. on a steam bath with stirring and heated for a total of 6½ hours. Carbon dioxide was given off during the first part of this heating. The resin was then washed, regenerated to the basic form with sodium hydroxide and again washed.

For an anion exchange resin to be effective in any exchange process in addition to having suitable exchange groups (in our process tertiary amino groups and not more than very small amounts of quaternary ammonium groups) it must be porous to the ions concerned in the adsorption—in our process to lignosulfonate ions. As used in the claims of this application, the term "porous" means porous to the lignosulfonate ion.

For an ion exchange resin with a given type of exchange group, it is possible to have different degrees of porosity, generally according to the manner and degree to which the resin is cross-linked. For any type of ion exchange resin there will generally be an optimum amount of cross-linkage. With very low amounts of cross-linking the resins may be highly porous but the resins will generally be so weak or will swell so highly as to be unsuitable for practical use. Usually with extremely high degrees of cross-linking the resin particles while having good dimensional stability may have too low porosity to permit adsorption of ions. The optimum will therefore represent a compromise between these two conditions.

It might be thought that the way to prepare resins of suitably high porosity of lignosulfonate adsorption would be to prepare directly amino type resins with as low degree of cross-linking as possible. In practice however, this method of preparation proves completely inadequate for several reasons.

In the first place, while a cross-linked resin containing amino group can be prepared in the wet state as a highly porous gel such amino resins are more or less gelatinous so that on drying they shrink, losing the greater part of their porous structure. The dried resins thus have a relatively low capacity for lignosulfonate. In addition, a resin of this type has poor mechanical properties in that when contacted with water it swells considerably and is partly gelatinized. It is therefore impractical to handle in conventional ion exchange equipment and thus from the standpoint of handling it is not a desirable type.

We have made the discovery that resins of great dimensional stabiilty and, as regards lignosulfonate adsorption, having both the required properties, of high porosity and freedom from all nitrogen containing groups except tertiary amino groups, can be made by a three-step procedure, the essential features of which follow:

*Step 1.—Preparation of porous phenolic resin.*—The general objective is to cross-link the resin as much as possible while it is in a highly swollen state. The phenol resin formed is relatively rigid even in the gel state so that it does not shrink when drying, and furthermore is quite stable on re-wetting. In preparing this type of resin, phenol and formaldehyde are reacted in water solution containing sodium hydroxide. Sufficient sodium hydroxide is added not only to catalyze the solution, but to keep the resin in solution as long as possible. The resin is then cured in the presence of water and becomes highly cross-linked so that it can be dried with essentially no shrinkage.

*Step 2.—Introduction of amino groups by reaction with a polyethylene polyamine.*—To introduce amino groups the dried granulated phenolic resin is reacted by heating with a polyethylene polyamine directly or in a substantially anhydrous organic solvent. An example of a suitable solvent is toluene and the reaction will occur readily without the use of a catalyst.

*Step 3.—Methylation of porous amino resins.*—All primary and secondary amino groups in the porous amino resin formed as described in step 2 are converted to tertiary groups without forming any ammonium groups by methylating with formic acid and formaldehyde in a manner similar to that described for the methylation of a porous commercial amino resin and as described in detail in our co-pending application.

It is possible to determine the absolute porosity of ion exchange resins by means of surface area measurements. Such measurements, however, are exceedingly complex and the procedure is not well adapted for use as a routine check of the suitability of the physical properties of the resin for our process. We find it more practical and convenient to prepare or select resins with exchange groups known to be effective and to judge whether the resin is porous by determining whether it will adsorb lignosulfonate ions under conditions which are standard, simple and readily reproducible.

The following procedure may conveniently be used to determine in this manner whether a resin is sufficiently porous to be useful in our process:

Approximately 200 ml. of stripped sulfite waste liquor is passed through a column of 17 mm. diameter which contains 100 ml. of wet, regenerated resin at a flow rate of approximately 3.5 ml. per minute. The column is then washed with water until the effluent is colorless and the effluent and washings are combined. The resin is regenerated by passing 100 ml. of 5% NaOH through the column at a flow rate of approximately 2 ml. per minute, followed by a water wash. The regeneration effluent and washings are then combined.

The estimation of the amount of lignosulfonic acid taken up by the resin can most simply be based on the fact that lignosulfonate ion has a very strong and characteristic absorption of light in the ultraviolet wave lengths. By determining on this basis the concentration of lignosulfonic acid in the original solution and that in the combined regeneration effluent and washings, the amount of lignosulfonic acid adsorbed on the resin is given by difference.

A convenient procedure for determining lignosulfonic acid in solution for such resin testing or for determining lignosulfonic acid in solutions at any stage of the process of the invention is given below. This method is applicable to either the original sulfite waste liquor or to intermediate or final solutions of the ion exchange process containing the lignosulfonate ion.

Ultraviolet absorption measurements are made on lignosulfonate containing solutions with a spectrophotometer (conveniently a Beckman spectrophotometer using 1 cm. quartz cells and a hydrogen arc lamp as a light source). The solutions are diluted with distilled water to a known volume such that an optical density reading is obtained which is within the range of the instrument, and the optical density is determined at a wave length of 232.6 millimicrons. The concentration of lignosulfonic acid is then determined by use of the following expression:

$$c = \frac{\text{optical density}}{41.8}$$

where $c$ is the concentration of lignosulfonic acid in grams per liter. The concentration of lignosulfonic acid in the undiluted solution can then be calculated from this value.

The constant 41.8 given in the formula has been determined empirically using a highly purified sample of lignosulfonic acid from sulfite waste liquor from hemlock wood. In order to determine absolute yields of lignosulfonic acid from liquors from different sources, it may be necessary to redetermine this constant for each type of liquor used.

PREPARATION OF RESIN FOR LIGNOSULFONATE RECOVERY FROM SIMPLE MATERIALS

The following example illustrates the preparation from simple materials of a resin in which the only nitrogen groups are tertiary amino groups and which has sufficient porosity to effectively adsorb lignosulfonate.

*Preparation of resin.*—94.1 gm. phenol, 14.6 gm. acetone, 167 ml. formalin, and 2 gm. NaOH dissolved in 68 ml. of water were placed in a resin flask and heated on the steam bath for 2½ hours by which time it had set to a firm gel. It was heated for an additional ½ hour and then removed, broken up into small chunks and placed in an Alberger autoclave with 50 ml. of water. It was then heated for two hours at 110° C., removed, washed, and dried at 40° C. The dry resin was then ground to pass through a 20 mesh screen. It was then placed in the Alberger autoclave with an equal quantity of tetraethylene pentamine (as a 20% solution in toluene) and heated for one hour at 140° C. It was then removed, washed with methanol and then with water, and 120 ml. of the drained, wet resin was regenerated with 5% NaOH, washed thoroughly, and drained. It was then placed in a flask equipped with a stirrer and reflux condenser with 35 gm. formalin and 35 gm. formic acid and heated on the steam bath for 30 minutes with stirring. The resin swelled considerably and it was necessary to add an additional 35 gm. of formalin and 35 gm. formic acid. The mixture was then heated and stirred for an additional 5 hours, and was then removed and washed thoroughly with water.

*Tests on resin.*—Capacity tests were run on the resin both before and after methylation with formic acid and formaldehyde. The test was carried out by regenerating the resin with 5% NaOH for one hour, washing thoroughly with water, and treating 100 ml. of the resin in a column with stripped ammonia base sulfite waste liquor containing 10 gm. lignosulfonic acid, and regenerating with 150 ml. of 5% NaOH. The adsorption and regeneration effluents were analyzed for lignosulfonic acid by use of the Beckman spectrophotometer. The results are as follows:

|  | Before Methylation | After Methylation [1] |
|---|---|---|
| LSA in Adsorption effluent (per 100 ml. resin used) gm | 3.9 | 6.05 |
| LSA in Regeneration effluent (per 100 ml. resin used) gm | 3.5 | 3.66 |
| Regeneratable Capacity of Resin, gm./LSA 100 ml. resin | 3.5 | 4.89 |
| Efficiency of Regeneration, Percent | 57.5 | 93 |

[1] Tests run on 75 ml. resin.

An unexpected feature of our invention is that the anion exchange resin need not be strongly basic, even though actual "salt splitting" of the lignosulfonate salt occurs. In order to demonstrate that a high basicity is neither required nor desired, relative basicities of the resins may be determined by the following procedure:

Five grams of dry resin are regenerated by soaking in three changes of 5% sodium hydroxide solution, allowing one hour between changes. The resin is then thoroughly rinsed with distilled water until the rinse water is neutral, and covered with 50 ml. of a 1% solution of sodium chloride and stirred for one hour. A sample of the supernatant liquor is then removed and the alkalinity of the solution is determined by titration with a standard acid. The equivalents of sodium hydroxide formed may then be calculated, and this gives a measure of the basicity of the resin.

Table I shows below the relative basicities and the effects in our process of different degrees of alkylation of an anion exchange resin which is porous enough to adsorb lignosulfonate.

*Table I.—Basicities and effects of different degrees of alkylation and lignosulfonate adsorbing resins*

| Main Anion Exchange Groups in Resin | Resin Basicity Test (Milli-equiv.) of NaOH Liberated | Lignosulfonate Adsorption Test | |
|---|---|---|---|
| | | Resin Capacity (gm. LSA Adsorbed/ 100 ml. wet resin) | Percent of Adsorbed LSA Eluted |
| Substantial Content of Primary and Secondary Amino Groups (Duolite A-2) | 0.073 | 5.5 | 44 |
| Tertiary Amino Groups and Quaternray Ammonium Groups (Duolite A-4) | 0.35 | 5.2 | 84 |
| Tertiary Amino Groups (Duolite A-2 Methylated with formic acid and formaldehyde) | 0.06 | 5.8 | 97 |
| Quaternary Ammonium Groups (Resin above alkylated by methyl bromide) | 1.1 | 5.3 | 63 |

As outlined heretofore, an important feature in the preferred operation of our invention is the use of a cation exchange resin containing carboxyl groups to remove excess alkali from the lignosulfonate eluted from the anion exchange resins. The process of the invention is not limited to any particular manner of preparation of the carboxylic acid type ion exchange resins used. Some methods whereby satisfactory weakly acid resins may be prepared follows.

Carboxylic acid type resins may be prepared by polymerizing or co-copolymerizing unsaturated organic acids or their anhydrides under conditions whereby cross-linked polymers are formed. Alternatively esters of unsaturated organic acids may be polymerized to form a cross-linked resin and later saponified. Again, noncross-linked alkali-soluble polymers containing carboxyl groups may be subjected to a cross-linking reaction to prepare an insoluble ion exchange resin. Again, carboxylic acid groups may be introduced into natural polymers not already containing these groups. In such cases where necessary to obtain insolubility, prior, concurrent or subsequent cross-linking treatment would be effected. Introduction of carboxylic acid groups would be effected by such means as substitution of carboxyalkyl groups or by partial oxidation of the original structure.

Ion exchange resins containing both carboxylic acid and phenolic hydroxyl groups may be prepared by polymerizing simple molecules containing both carboxyl and hydroxyl groups. Alternatively, such resins may be prepared by subjecting polymeric materials containing phonolic hydroxyls as the only exchange group to procedures whereby carboxylic acid groups are introduced in addition to the phenolic hydroxyl groups. Here also, where necessary to obtain insolubility, prior, concurrent, or subsequent cross-linking will be effected.

A specific example of a carboxylic acid resin which may be used in the invention is a maleic anhydride-styrene copolymer which has been cross-linked by the use of divinyl-benzene and hydrolyzed to the free acid form. A batch of suitable resin of this type was prepared as follows:

Ninety ml. of styrene, 60 ml. of a divinylbenzene solution containing 20–25% divinylbenzene dissolved in other aromatic hydrocarbons, 100 g. of maleic anhydride, and 50 ml. of acetone were heated on a steam bath for a period of two hours. Temperature in the mixture rose to a maximum of 107° C. and dropped to 90° C. at the end of the two-hour period. The product was then heated in an oven at 135° C. for three hours. It was then washed thoroughly with acetone, soaked for 18 hours in 5% NaOH and then thoroughly washed with water and dried. Yield of product was 121 g.

A commercial resin containing carboxylic acid cation exchange centers (sold under the trade-name of Amberlite IRC–50) has also been used satisfactorily in the practice of the invention.

RECOVERY OF AMMONIA FOR RE-USE IN PULPING

The free ammonia in the unadsorbed effluent from the treatment with the anion exchange resin may be recovered by stripping in a conventional manner such as by means of steam or air flowing countercurrent to the effluent in a packed stripping column. Condensation of the overgas from steam stripping will give an aqueous ammonia solution which may be conveniently used in the preparation of ammonia base acid sulfite pulping liquor. In the case of stripping by air the mixture of air and ammonia from the stripping column could be conveniently used in an absorption column in preparation of acid sulfite pulping liquor.

Alternatively a sutiable weakly acidic cation exchange resin for example a carboxylic acid type or phenolic hydroxyl type resin in hydrogen form is contacted with a proper amount of the unadsorbed effluent containing free ammonia. This may be accomplished in a number of ways, as for example, by passing the solution through a bed of the resin or by adding the resin to the solution either batchwise or in a continuous manner, later separating the resin from the solution by mechanical means. The free ammonia is readily and substantially completely adsorbed on the weakly acidic resin together with small amounts of additional ammonia by splitting any ammonium salts also present.

The resin containing adsorbed ammonium ions may be washed to remove excess unadsorbed effluent containing waste liquor constituents. Washing, however, is not absolutely necessary in that, if the recovered ammonia is to be used in making up ammonia base pulp liquor, recycling an appreciable amount of the waste liquor constituents is not harmful. The resin containing ammonium ions, either washed or unwashed, is treated with an excess of sulfurous acid solution which readily effects a complete regeneration of the resin and desorption of the ammonium ions to form an effluent containing ammonia bisulfite and free sulfurous acid. This solution may be used directly as acid sulfite pulping liquor or as acid sulfite prehydrolysis liquor or for these purposes may be diluted, if desired, or fortified with additional free $SO_2$.

The above-mentioned treatment with sulfurous acid solution completes the cycle, in that it leaves the resin ready for re-use in adsorbing ammonia from further additional ammonia containing effluent.

*Example I*

Nineteen and one-half liters of methylated Duolite A-2 resin held by a glass column was put in the free base condition using 5% NaOH solution. After the excess alkali had been removed by washing with water, 35 liters of ammonia base sulfite waste liquor was passed through the resin for recovery by adsorption of a portion of the lignosulfonate. The effluent liquor from this treatment was subjected to a steam distillation and 55.7 gm. $NH_3$ recovered.

*Example II*

Thirty-five liters of ammonia base sulfite waste liquor was passed through a column containing 19.5 liters of methylated Duolite A-2 resin in the free base condition for recovery by adsorption of a portion of the lignosulfonate. The effluent liquor or leakage from this treatment was collected and saved for later treatment. The resin was washed with water and thereafter regenerated with a solution containing 40 gm. NaOH/liter and 32 gm. LSA/liter. The effluent obtained during regeneration was at first discarded, next recycled to regenerant makeup, withdrawn as product, and finally again recycled. The resin bed was then washed with water, the first effluent being recycled. The subsequent effluent, however, which contained some NaOH was added to the leakage from the adsorption step and subjected to steam distillation. Under these conditions 64.0 gm. $NH_3$ was recovered.

Figure 2 illustrates our invention in a more complete form. Ammonia base sulfite waste liquor is steam stripped to remove free $SO_2$. The stripped liquor is then treated with a highly porous anion exchange resin containing essentially tertiary amino groups which adsorbs a portion of the lignosulfonate content of the waste liquor. The effluent from this treatment containing unadsorbed lignosulfonate, sugars, and free ammonia is treated to recover the free ammonia by stripping or cation exchange as described above. Following recovery of the free ammonia, the effluent is combined with such other portions of the sulfite waste liquor as is being evaporated and combusted for recovery of heat or heat and sulfur dioxide or being combusted simply for disposal.

The anion exchange resin containing adsorbed lignosulfonate is washed with water, and regenerated with a sodium hydroxide solution which removes the lignosulfonate from the resin and results in an alkaline solution of sodium lignosulfonate. The resin is again washed with water and is then ready for reuse.

In order to remove the small amount of excess sodium hydroxide which is present in the lignosulfonate solution, this solution is then treated with a cation exchange resin of the carboxylic acid type in hydrogen form which results in a neutral or slightly acid (i. e. pH greater than 4) solution of sodium lignosulfonate which can be used as such, evaporated to a concentrated solution, or evaporated to dryness.

The cation exchange resin is washed with water and the adsorbed sodium is removed by treatment of the resin with sulfur dioxide solution. The cation exchange resin is washed and is then ready for re-use.

The solution resulting from the removal of excess alkali and calcium by the above process (and which is preferably slightly acid) can be evaporated by conventional means to a concentrated solution or to a dry powder. This product is essentially free of sugars and calcium and can be used for tanning agents, dispersing agents, in ore flotation, or as the raw material for the preparation of lower molecular weight pure chemicals such as vanillin or vanillic acid.

For certain uses, a slight excess of alkali in the product will not be objectionable. In such case, the treatment with the cation exchange resin is not necessary and the product solution from the anion exchange resin may be evaporated directly. When so operating it will be advantageous to carry out the elution of lignosulfonate from caustic soda countercurrently, as heretofore described, and to utilize an initial fraction of the regeneration effluent as product solution. The balance of the regeneration effluent, high in excess caustic soda, would be recycled and used in making up regeneration solution for a succeeding cycle.

The example outlined above and illustrated in Figure 2 is only intended as an illustration of one embodiment of the invention. As an example of use in another pulping operation, the invention may be applied to a pulping sequence wherein lignocellulosic material (e. g. wood) is digested in one stage with ammonia base acid sulfite solution and in a succeeding stage with an alkaline solution, as illustrated in Figure 3. The feed liquor used is a portion of the waste liquor from the first digestion of the wood with acid sulfite digestion liquor (ammonium bisulfite-sulfurous acid), such waste liquor being termed in the diagram "Waste Effluent from Acid Sulfite Prehydrolysis of Wood." The portion of the waste effluent from acid sulfite digestion not used in the ion exchange process is combined with the waste effluent from the alkaline digestion for evaporation and furnacing to recover heat and a soda base smelt containing inorganic chemical values. With the exceptions noted below, the succeeding steps are similar to the corresponding numbered steps of Figure 2. In Figure 3 the waste effluent from the anion exchange treatment after recovery of free ammonia is added to the combined waste acid and alkaline digestion liquors being evaporated and combusted for recovery of heat and inorganic pulping chemicals. (In Figure 2 this effluent after recovery of free ammonia is added to the waste acid sulfite effluent which is evaporated alone and combusted.)

Sugar-free sodium lignosulfonate recovered from waste acid sulfite prehydrolysis liquor, like the product from regular waste sulfite pulping liquor, may be evaporated by conventional means to a concentrated solution or dry powder. This product, however, as compared to that obtained from waste acid sulfite pulping liquor, is very light in color. This presents advantages for uses where color is important.

As an example of use in another pulping operation, the invention may be applied to a pulping sequence wherein lignocellulosic material (e. g. wood) is digested in one stage with ammonia base acid sulfite solution and in a succeeding stage with an alkaline solution containing sodium sulfite (e. g. $NaOH + Na_2SO_3$, $Na_2CO_3 + Na_2SO_3$ or a mixture of all three of these chemicals). If only the waste alkaline solution is evaporated and burned for recovery of inorganic chemicals, the ion exchange process may still be readily integrated with this pulping operation. For such integration, the sodium bisulfite produced as a by-product from the regeneration of the carboxylic acid resin column will be used to supply a portion of the make-up sodium sulfite used in the alkaline pulping digestion liquor.

If in such pulping operation the acid sulfite digestion is carried out by means of ammonia base cooking acid, and the portion of the sulfite waste liquor not used in the ion exchange lignosulfonate recovery process is simply discarded, then the unadsorbed effluent from the anion exchange treatment after ammonia recovery may be similarly discarded.

In addition to being sugar-free, a unique characteristic of the lignosulfonate products of the invention is that they represent a lower molecular weight fraction than the entire lignosulfonate content of the waste sulfite pulping or prehydrolysis liquor used as a raw material. This is shown by measurements of the diffusion coefficients of the lignosulfonate products in agar gels, in general the molecular weight being inversely proportional to the cube of the diffusion coefficient. The measurement of diffusion coefficients can conveniently be carried out according to the procedure published by Felicetta, Markham, and McCarthy in the Journal of the American Chemical Society, vol. 71, page 2879, August 1949.

The lower molecular weight and higher diffusivity of the lignosulfonates products of the invention may be of significance in certain uses, particularly in applications making use of the colloidal properties of the products.

In order to demonstrate the differences in molecular weight between the entire lignin content of the feed liquor and the product recovered by ion exchange, the process of the invention was carried out using as starting material, in place of sulfite waste liquor, the entire lignosulfonate content of sulfite waste liquor which had been already isolated without fractionation in a sugar-free condition by a liquid extraction process. Diffusion coefficient measurements were then carried out on the unfractionated starting material, and on the fractions of this material which were adsorbed and unadsorbed on the anion exchange resin in the process of the invention.

The unfractionated sugar-free lignosulfonate used as starting material was prepared from sulfite waste liquor by first removing essentially all cations other than hydrogen by ion exchange, then extracting all lignosulfonate with a butanol solution of di-2-ethylhexylamine, followed by extraction of sodium lignosulfonate from the butanol solution by dilute sodium hydroxide solution.

When this unfractionated, sugar-free sodium lignosulfonate was subjected to the process of the invention, diffusion coefficients were obtained on the original materials and on the fractions obtained as follows:

| | Diffusion Coefficient of Material | Molecular Weight |
|---|---|---|
| Unfractionated sugar-free sodium lignosulfonate used as starting material in process of invention. | 12.6 mm.²/day | 11,500 |
| Sodium lignosulfonate fraction adsorbed on anion exchange resin and removed by regeneration according to process of invention. | 15.0 mm.²/day | 6,800 |
| Sodium lignosulfonate fraction not adsorbed on anion exchange resin in process of invention. | 8.4 mm.²/day | 39,000 |

As a relative measure of molecular weight, molecular weights in column 2 are calculated from the diffusion coefficients in column 1 by means of the Stokes-Einstein equation which assumes spherical non-interacting, non-hydrated molecules $$M = \frac{K}{D^3}$$

where $$K = \frac{(RT)^3 \rho}{162\pi^2 \eta N^2} = 23 \times 10^6$$

under the conditions of our measurements.

In one of the aspects of our invention, the alkaline solution of lignosulfonate resulting from the regeneration of the anion exchange resin may be used directly in the production of mildly alkaline-modified lignosulfonates (referred to hereinafter also as "acid-soluble, alkaline-modified lignosulfonates") or for more drastic alkali treatment to produce by cleavage vanillin or other mononuclear proucts together with a highly modified and largely desulfonated lignin residue (hereinafter referred to as "alkali-modified, acid-insoluble lignosulfonates"). Use of the alkali-containing lignosulfonate solution from the regeneration of the anion exchange resin directly for either mild alkali treatment or drastic alkali treatment to produce vanillin or related materials, makes possible a twofold use of the sodium hydroxide used in the ion exchange process, i. e., as a regenerant for the anion exchange resin and to furnish at least part of the alkali requirement for the subsequent alkaline modification or alkaline cleavage treatment.

There are marked advantages for using the sugar-free sodium lignosulfonate of the invention, rather than sulfite waste liquor, in drastic alkaline treatments for the production of vanillin or other cleavage products. In the first place, as elsewhere pointed out, the alkaline-containing lignosulfonate solution from the regeneration of the anion exchange resin may be used directly in drastic alkaline cleavage reactions thus supplying part of the alkali required for the alkaline cleavage reaction. Secondly, in that the lignosulfonate product of the anion exchange process is substantially free from sugars, by its use rather than use of sulfite waste liquor, there will in general be less consumption of caustic soda—by elimination of side reactions between alkali and sugars. Again, by use of sugar-free lignosulfonate as starting material, the lignosulfonate residue remaining after splitting off vanillin or related cleavage products such as vanillic acid is not contaminated by sugars or their complex degradation products and hence constitutes a much higher grade by-product. Such by-products after removal of any excess caustic soda (conveniently by ion exchange) and after removal of any heavy metal added as a catalyst in the alkali cleavage reaction, constitute very effective dispersing agents for dispersing such materials as carbon black, clays, etc. This type of lignin dispersing agent is very largely desulfonated so that it will largely precipitate upon acidification. This property is very advantageous for such uses as the dispersion of carbon black in a latex since, by virtue of the acid insolubility, addition of acid to the latex serves to co-precipitate both rubber and carbon black. Such co-precipitation, produces a very uniform dispersion of carbon black in rubber and without the power consumption that would be required to disperse carbon black in solid rubber mechanically or by melting on rolls.

The conditions for the production of mildly alkaline-modified sodium lignosulfonate (i. e., products which are still sufficiently sulfonated to remain soluble on acidification) are very mild as compared to those used in alkaline cleaverage reactions for the production of vanillin, vanillic acid, etc. This is particularly the case as regards the proportion of sodium hydroxide to lignin used. Thus to improve the tanning or dispersing properties, sodium lignosulfonate, either as the intermediate products solution from the anion exchange treatment or after subsequent treatment with a cation exchange resin, is heated with aqueous alkali under relatively mild conditions. The conditions to improve the properties by such treatment are not critical. We have used quantities of sodium hydroxide ranging from 0.2 to 3.0 times the quantity of lignosulfonate present and temperatures of from 80° to 150° C. For the particular conditions of caustic soda concentration and temperature used, a reaction time is chosen so that the desulfonation will stop short of the point where there will be appreciable acid insolubility.

The improvement in tanning or dispersing properties may not be a result of the desulfonation itself but may result from other more fundamental changes in the lignin molecule occurring simultaneously. This is indicated by the fact that we have found that modified products of desirable properties are obtained by treating lignosulfonate with alkali to a point of substantial acid insolubility and then resulfonating to render the product acid soluble. In the present invention, however, the solubility changes occurring with desulfonation provide a convenient method of regulating the severity of the alkaline modification treatment within the limit desired.

Following heating the lignosulfonate solution with alkali as described above, excess alkali is removed with a cation exchange resin of the carboxylic type in the manner described previously. The product may be then evaporated to a concentrated solution or dry powder as desired.

Many attempts have been made in the past to employ sulfite waste liquor products as tanning agents with very little success, even though the calcium in the liquor is replaced with sodium or other suitable cation.

We have found, however, that the sodium lignosulfonate prepared by the process of the invention has improved tanning properties over the sulfite waste liquor from which it is prepared. Whereas calfskin tanned with sulfite waste liquor, treated only to replace calcium by sodium, was very dark in color and hard and brittle (i. e., not "leathered"), calfskin which was tanned with sodium lignosulfonate prepared by the process of the invention was definitely "leathered" and much lighter in color. A still further improvement can be made by alkali modifying the sodium lignosulfonate produced as heretofore described. Calfskin which was tanned with the alkali modified sodium lignosulfonate was tan in color and had a firm but pliable feel.

We have found that the sodium lignosulfonates prepared by the process of the invention (including those modified by alkali treatment) are excellent dispersing agents for solid materials such as clay, pigments, etc. Very small quantities are capable of imparting a tremendous viscosity reduction to dispersions of high solids content which would ordinarily be pastes, but which in the presence of the products of our invention are freely flowing fluids. Products such as these are of importance for use in such dispersions as pottery clay dispersions, printing inks, and as emulsifiers for oil in emulsion type oil well drilling muds. In view of the substantial absence of sugars and low content of heavy metals and other impurities, the products of the invention will find especially advantageous application in such dispersing uses where presence of the usual impurities of sulfite waste liquor would be objectionable. In view of the low content of sugars the products are especially suitable for use in cement manufacture or use either as aids to grinding the clinker or as additives to improve dispersion or promote air entraining.

In order to clearly illustrate the process of the invention, a specific example is given below. This is not intended to limit the invention to the specific conditions given, but is merely illustrative of the process which may be used in practicing the invention.

*Example*

Using automatic ion exchange equipment, 118 repeated cycles were carried out as follows:

In the first stage, 19.5 liters of wet, anion exchange resin (Duolite A-2) methylated with formic acid and formaldehyde as heretofore described, was placed in a 6-inch inside diameter glass column and 35.0 liters of stripped ammonia-base sulfite waste liquor containing 90–100 grams of lignosulfonic acid per liter was passed through the column at 20° C. and at a rate of 2.3 liters per minute. During this period, lignosulfonic acid was adsorbed by the resin. Following a brief wash the resin was regenerated at 20° C. and a flow rate of 2.4 liters per minute with 48 liters of a solution containing sodium lignosulfonate equivalent to 14 gm. of lignosulfonic acid per liter and 35 gm. of sodium hydroxide per liter. During this period lignosulfonic acid was desorbed by the regenerant and recovered in the effluent which was divided into four fractions. The first fraction containing chiefly displaced water was discarded, the mixed second and fourth fractions containing considerable alkali and sodium lignosulfonate equivalent to 14 gm. of lignosulfonic acid per liter was fortified with alkali and recycled for use in subsequent regenerations, while the third fraction containing 2–8 gm. of sodium hydroxide per liter and sodium lignosulfonate equivalent to 50–55 gm. of lignosulfonic acid per liter was collected as first stage product.

After 183 cycles, the capacity of the anion exchange resin was 4.0 gm. of lignosulfonic acid per 100 milliliters of wet regenerated resin and the resin showed no signs of physical deterioration.

The first stage product, free from sugar but contaminated with excess alkali, was passed through a 6-inch inside diameter glass column containing 18.0 liters of wet carboxylic-acid-type cation exchange resin (Amberlite IRC-50 in the hydrogen state) at 20° C. whereupon the excess sodium was adsorbed. The final product then contained sodium lignosulfonate equivalent to 40–45 gm. of lignosulfonic acid per liter, had a pH of 6–7, and was substantially free from cations other than sodium. The cation exchange resin required regeneration with a 2–3% solution of sulfur dioxide in water only once every 15 cycles.

We claim:

1. A process for the separation of a lignosulfonate fraction from a lignosulfonate containing waste effluent which comprises subjecting waste liquor from the ammonia base acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, and treating said resin containing adsorbed lignosulfonate with an alkaline solution to form a lignosulfonate solution substantially free from other organic components of the waste liquor.

2. In the process of claim 1, using sodium hydroxide to treat the resin containing adsorbed lignosulfonate.

3. In the process of claim 1, treating the alkaline lignosulfonate solution freed from other organic components of the waste liquor with a cation exchange resin in hydrogen form to remove the alkalinity.

4. In the process of claim 1, treating the alkaline lignosulfonate solution freed from other organic components of the waste liquor with a cation exchange resin in which the active exchange centers are carboxylic groups in hydrogen form whereby alkalinity is removed and calcium contamination is selectively adsorbed.

5. In the process of claim 4, regenerating the cation exchange resin with sulfurous acid and forming a solution containing sodium bisulfite.

6. In the process of claim 1, using an anion exchange resin free from primary and secondary amino groups as a result of treatment with formic acid and formaldehyde.

7. In the process of claim 1, using a sulfite waste liquor of approximately digester strength.

8. In the process of preparing wood pulp and recovering chemicals wherein wood is digested with an ammonia base acid sulfite solution and in which waste liquor from the wood digestion is evaporated and combusted to yield heat and inorganic chemicals, the improvement which comprises subjecting a portion of the unevaporated waste liquor to steam strip stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is absorbed on the resin, treating said resin containing adsorbed lignosulfonate with sodium hydroxide solution to form an alkaline lignosulfonate solution substantially free from other organic components of the waste liquor, treating said alkaline lignosulfonate solution with a cation exchange resin in which the active exchange centers are carboxylic acid groups in hydrogen form whereby excess sodium hydroxide is removed and calcium contamination selectively adsorbed, regenerating said cation exchange resin, treating an effluent solution from the anion exchange adsorption containing ammonia and unadsorbed lignosulfonates for the recovery of ammonia, combining the effluent after recovery of ammonia with the other portion of the unevaporated waste liquor, and evaporating the combined liquors and burning the resulting concentrate.

9. In the process of preparing wood pulp and recovering chemicals wherein wood is digested successively with ammonia base acid sulfite solution and an alkaline pulping solution and the combined waste acid and alkaline liquors are evaporated and combusted to yield heat and inorganic chemicals, the improvement which comprises subjecting a portion of the unevaporated waste liquor from the acid sulfite digestion to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor accounts, whereby a portion of the lignosulfonate content of the liquor is adsorbed on the resin, treating the effluent waste liquor from said resin treatment with a carboxylic cation exchange to absorb ammonia, regenerating the cation exchange resin with sulfurous acid to recover ammonia, treating said anion exchange resin containing adsorbed lignosulfonate with sodium hydroxide solution to form an alkaline lignosulfonate solution substantially free from other organic components of the waste liquor, treating said alkaline lignosulfonate solution with a cation exchange resin in which the active exchange centers are carboxylic acid groups in hydrogen form whereby excess sodium hydroxide is removed and calcium contamination selectively adsorbed, regenerating said cation exchange resin with sulfurous acid and combining for evaporation and burning the portion of the waste acid sulfite liquor not used for lignosulfonate recovery, the waste alkaline digestion liquor and the effluent from the lignosulfonate adsorption after recovery of ammonia.

10. A process for the separation of a lignosulfonate fraction from a lignosulfonate containing waste effluent which comprises subjecting waste liquor from the ammonia base acid sulfite digestion of wood to steam stripping to remove sulfur dioxide, treating the stripped liquor containing the cations used as a pulping base with a porour anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, treating said resin containing adsorbed lignosulfonate with a sodium hydroxide solution to form an alkaline lignosulfonate solution substantially free from other organic components of the waste liquor, heating said alkaline lignosulfonate solution under conditions sufficient to partially desulfonate the lignosulfonate without making it acid insoluble, treating said lignosulfonate solution with a cation exchange resin in which the active exchange centers are carboxylic acid groups in hydrogen form whereby alkalinity is removed and calcium contamination selectively adsorbed.

11. A process for the separation of a lignosulfonate fraction from a lignosulfonate containing waste effluent which comprises subjecting waste liquor from the ammonia base acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, treating said resin containing adsorbed lignosulfonate with sodium hydroxide to form a lignosulfonate solution substantially free from other organic components of the waste liquor, adding additional sodium hydroxide to said lignosulfonate solution, heating the resulting alkaline solution for a period of time sufficient to partially desulfonate the lignosulfonate without making it acid insoluble, and treating said solution with a cation exchange resin in which the active exchange centers are carboxylic acid groups in hydrogen form whereby alkalinity is removed and calcium contamination selectively adsorbed.

12. The method of producing lignosulfonate of relatively low molecular weight which comprises removing sulfur dioxide from waste liquor from the ammonia base acid digestion of wood, contacting the resulting waste liquor with an anion exchange resin having basic radicals preponderantly as tertiary amino groups, using an excess of waste liquor with respect to the resin to effect a selective adsorption of lignosulfonate of low molecular weight, and treating the resin having adsorbed lignosulfonate with an alkaline solution to form a solution of low molecular weight lignosulfonate.

13. In the recovery of chemicals from sulfite waste liquor from the ammonia base acid sulfite digestion of wood stripped of sulfur dioxide and containing the pulping base cations, the steps which comprise adsorbing lignosulfonate from the liquor on an ion exchange resin having as active exchange groups tertiary amino groups in preponderant amount, and displacing the lignosulfonate from the resin with an alkaline solution.

14. In the recovery of chemicals from sulfite waste liquor from the ammonia base acid sulfite digestion of wood stripped of sulfur dioxide and containing the pulping base cations, the step which comprises adsorbing lignosulfonate from the liquor on an anion exchange resin having as active exchange groups tertiary amino groups in preponderant amount.

15. In the method of claim 1 in which a waste effluent from the ammonia base acid sulfite digestion of wood is made alkaline by an anion exchange treatment to adsorb lignosulfonic acid, subjecting the alkaline effluent containing the unadsorbed material to steam stripping whereby ammonia is recovered.

16. In the method of claim 1 in which a waste effluent from the ammonia base acid sulfite digestion of wood is made alkaline by an anion exchange treatment to adsorb lignosulfonic acid, treating the alkaline effluent containing the unadsorbed materials with a carboxylic acid type cation exchange resin in hydrogen form whereby free ammonia is adsorbed, regenerating said cation exchange resin with sulfurous acid whereby the adsorbed ammonia is eluted and recovered as an ammonium bisulfite-sulfurous acid solution.

References Cited in the file of this patent

UNITED STATES PATENTS

| | | |
|---|---|---|
| 2,354,553 | Sherk | July 25, 1944 |
| 2,470,500 | Lawrence | May 17, 1949 |
| 2,470,764 | Dunbar | May 24, 1949 |
| 2,481,768 | Mills | Sept. 13, 1949 |
| 2,568,925 | Mills et al. | Sept. 25, 1951 |
| 2,594,302 | Ehrensperger | Apr. 29, 1952 |

FOREIGN PATENTS

| | | |
|---|---|---|
| 859,205 | France | June 3, 1940 |